July 14, 1936.  L. H. GIBSON ET AL  2,047,262
DOUGHNUT COOKING MACHINE
Filed March 16, 1935
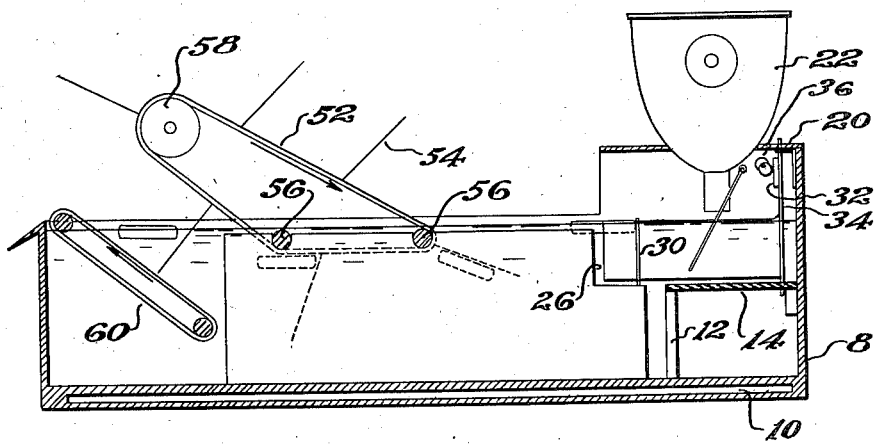
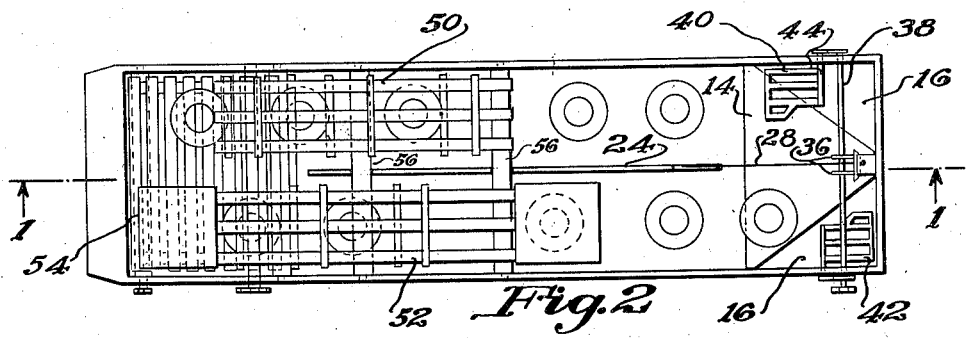
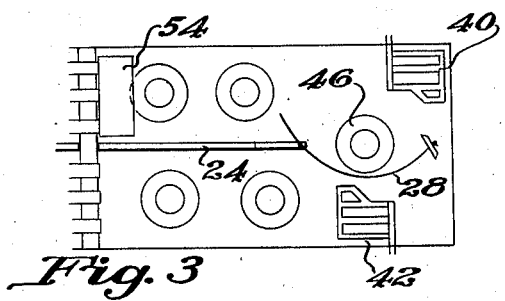
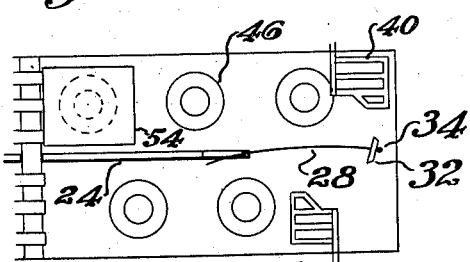
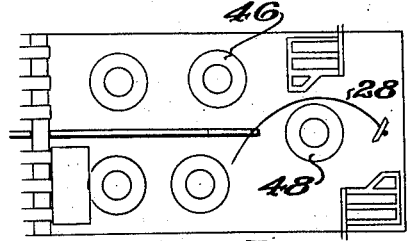
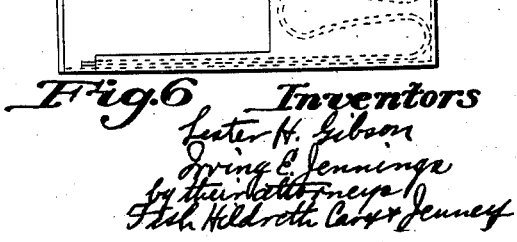

Patented July 14, 1936

2,047,262

UNITED STATES PATENT OFFICE 2,047,262

DOUGHNUT COOKING MACHINE

Lester H. Gibson, Boston, and Irving E. Jennings, Winchester, Mass., assignors to Gibson-Jennings Corporation, Boston, Mass., a corporation of Massachusetts Application March 16, 1935, Serial No. 11,456

11 Claims. (Cl. 53—7)

The present invention relates to doughnut cooking machines and has for its principal object the provision of an automatic machine for cooking doughnuts in large number and of uniform size and quality within a small space.

To this end, the present invention comprises the doughnut cooking machine hereinafter described and particularly defined in the claims.

In the accompanying drawing, Fig. 1 is a sectional elevation on line 1—1 of Fig. 2 of the preferred form of doughnut cooking machine; Fig. 2 is a plan view of the machine with portions removed for the sake of clearness; Figs. 3, 4 and 5 are diagrams illustrating the operation of the machine; and Fig. 6 is a bottom plan view on a reduced scale showing the disposition of the heating unit.

The illustrated embodiment of the invention comprises a rectangular tank 8 to contain oil which is heated by an electric heating unit 10 in the base. Supported on posts 12 at the rear end of the machine is a plate 14 of generally triangular form and arranged to leave the triangular open spaces 16 as indicated in Fig. 2. The heating unit 10, as shown in Fig. 6, is disposed below the tank and is provided at the rear end with a loop 18 to concentrate the greater part of the heating effect under the rear or right-hand part of the machine. As a consequence, convection currents are set up, the oil rising through the openings 16 and flowing along the tank to the front or left-hand end thereof, and then back along the bottom of the tank. This current is utilized for conveying the doughnuts through the machine.

Supported on a cover plate 20 is a hopper 22 containing a supply of dough and provided with any suitable form of cutting mechanism for introducing raw doughnuts at regular intervals into the oil immediately above the center of the plate 14. The plate 20 and hopper 22 are omitted from Fig. 2.

Forwardly of the plate 14, the tank is provided with a longitudinal partition 24 having in the upper rear corner a recess 26. The space in the rear of the partition 24 and under the cutter is a common receiving space for both channels. Doughnuts dropped into said space from the single cutter are alternately moved into the channels by a flexible deflector blade 28 which is supported above the plate 14 and extends approximately to the top of the oil. The forward end of the deflector is received in the recess 26 and passes through a loop of wire 30 which is fixed to the partition 24. At its rear end, the blade is secured to a plate 32 which is secured to a post 34. The post 34 is pivoted so that the plate can be rocked into different positions to flex the blade, as shown in Figs. 3, 4 and 5. Rocking of the plate 32 is accomplished by means of cams 36 disposed on opposite sides of the pivot and mounted on a transverse cam shaft 38.

At opposite sides of the machine are disposed a pair of grid-like pushers 40 and 42, each pivoted on a shaft 44 journaled in the frame of the machine. The pushers are actuated in synchronism with the deflector blade to advance the doughnuts through the oil.

The various cams and operating mechanisms are not shown in detail since their construction can readily be effected by one skilled in the art. The synchronized motions of the deflector 28 and the pushers 40 and 42 are shown in Figs. 3, 4 and 5. In these views, the plate 14 and all operating details are omitted.

In Fig. 3, the deflector blade 28 has been flexed to its extreme position in one direction and the cutter has dropped a raw doughnut 46 into the oil. Immediately thereafter, the blade starts to flex in the opposite direction, thereby moving the doughnut 46 sidewise toward the pusher 40 which is now in its rearward position. When the blade 28 is in approximately its median position, as shown in Fig. 4, the pusher 40 starts to move forward, thereby advancing the doughnut which has meanwhile been partially cooked on its under side and is therefore sufficiently firm to resist distortion. When the pusher 40 has advanced completely, the doughnut 46 has reached the position shown in Fig. 5. The deflector blade 28, which has been flexing toward its other extreme position, ultimately reaches the position shown in Fig. 5 and another raw doughnut 48 is dropped over the longitudinal median line of the machine. The deflector then moves back and deflects the doughnut into the line of motion of the other pusher 42. It will be seen that doughnuts are alternately deflected first to one side of the apparatus and then the other, and they course through the oil on opposite sides of the partition under the influence of the pushers and the convection current.

In the forward part of the machine and on opposite sides of the partition are provided two conveyor belts 50 and 52, each having outwardly extending blades 54. As shown in Fig. 2, the blades of the two belts are staggered since the doughnuts in the two channels do not arrive at their respective conveyors at the same time. The most advanced doughnut in the channel is engaged by a blade 54 and depressed into the liquid, as shown in Fig. 1, and when the blade reaches an approximately vertical position, the doughnut floats up in inverted position under the conveyor. Each conveyor is passed around submerged rollers 56 and an external driving pulley 58. The conveyor is synchronized with the cutter so that a blade overlies a partially cooked doughnut as the latter approaches the conveyor.

The conveyor blades 54 contribute to the current which is set up by the heating unit.

Beyond the point where the conveyor emerges from the oil, the doughnut floats on the surface, and is finally engaged by the end conveyor 60 by which it is discharged from the machine.

Having thus described the invention, what is claimed is:

1. A doughnut cooking machine comprising a tank to contain heated oil, the tank having a common receiving space and a plurality of channels leading therefrom, means for feeding raw doughnuts at intervals to the receiving space, a deflector for moving doughnuts successively from the receiving space into the different channels, and means for moving the doughnuts in the separate channels.

2. A doughnut cooking machine comprising a tank to contain heated oil, a partition dividing the tank into two channels, the tank having a common receiving space communicating with the channels, means for feeding raw doughnuts at intervals to the receiving space, a deflector for moving doughnuts from the receiving space alternately into the two channels, and means for moving the doughnuts in the channels.

3. A doughnut cooking machine comprising a tank to contain heated oil, a partition dividing the tank into two channels, the tank having a common receiving space communicating with the channels, means for feeding raw doughnuts at intervals to the receiving space, a deflector for moving doughnuts from the receiving space alternately into the two channels, the deflector comprising a flexing blade, and means for moving the doughnuts in the channel.

4. A doughnut cooking machine comprising a tank to contain heated oil, the tank having a plurality of channels, single means for feeding raw doughnuts at intervals to the oil, a deflector for moving doughnuts thus fed successively into the different channels, a conveyor for each channel having means for successively submerging and inverting the doughnuts therein, and means for moving the doughnuts in the separate channels to the respective conveyors.

5. A doughnut cooking machine comprising a tank to contain heated oil, the tank having a partition dividing the tank into two channels, single means for feeding raw doughnuts at intervals to the oil, a deflector for moving doughnuts thus fed alternately into the two channels, a conveyor for each channel having means for successively submerging and inverting the doughnuts therein, and means for moving the doughnuts in the separate channels to the respective conveyors.

6. A doughnut cooking machine comprising a tank to contain heated oil, the tank having a plurality of channels, means for feeding raw doughnuts at intervals to the oil, a deflector for moving doughnuts thus fed successively into the different channels, and a pusher for each channel operable in synchronism with the deflector to advance a deflected doughnut in the respective channel.

7. A doughnut cooking machine comprising a longitudinal tank to contain oil, means for feeding raw doughnuts at intervals at one end of the tank, and means for heating the oil having provision for concentrating a major portion of the heat at the end of the tank into which the doughnuts are fed to set up convection currents to move the doughnuts toward the other end of the tank.

8. A doughnut cooking machine comprising a longitudinal tank to contain oil, means for feeding raw doughnuts at intervals at one end of the tank, a plate in the oil below the feeding means and recessed to provide openings adjacent to the end of the tank, and means for heating the oil having provision for greater heating at said end of the tank than elsewhere to set up convection currents upwardly through said openings and thence toward the other end of the tank.

9. A doughnut cooking machine comprising a tank to contain heated oil, the tank having a common receiving space and two channels leading therefrom, single means for feeding raw doughnuts at intervals into the receiving space, and means for moving doughnuts from the receiving space alternately into the two channels to progress along the channels.

10. A doughnut cooking machine comprising a tank to contain heated oil, the tank having a common receiving space and two channels leading therefrom, single means for feeding raw doughnuts at intervals into the receiving space, and means for moving doughnuts from the receiving space alternately into the two channels to progress along the channels, said moving means comprising a flexible blade, and means for flexing the blade in synchronism with the feeding means.

11. A doughnut cooking machine comprising a tank to contain heated oil, the tank having a plurality of channels, single means for feeding raw doughnuts at intervals to the oil, a deflector for moving doughnuts thus fed successively into the different channels, and a conveyor for each channel having blades for successively submerging and inverting the doughnuts therein, the blades of the two conveyors being staggered.

LESTER H. GIBSON.
IRVING E. JENNINGS.